United States Patent Office 2,897,190
Patented July 28, 1959

2,897,190

METALLIFEROUS AZO-DYESTUFFS

Alfred Fasciati, Bottmingen, Switzerland, assignor to Ciba Limited, Basel, Switzerland, a Swiss firm No Drawing. Application October 17, 1955
Serial No. 541,042

Claims priority, application Switzerland
December 21, 1951

7 Claims. (Cl. 260—147)

This application is a continuation-in-part of my application Serial No. 327,033, filed December 19, 1952 (now abandoned).

According to this invention valuable new metalliferous azo-dyestuffs are made by treating with an agent yielding chromium, a monoazo-dyestuff which is free from sulfonic acid groups, contains a single carboxylic acid group which is not bound in a position vicinal to a hydroxyl group or —$NH_2$ group, and corresponds to the general formula (1) 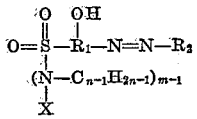

in which $R_1$ represents a benzene radical bound to the azo linkage in ortho-position to the hydroxyl group, —$R_2$ represents the radical of a coupling component bound to the azo linkage in a position vicinal to a hydroxyl group, $n$ represents a whole number not greater than 7, $m$ represents the whole number 1 or 2, and X represents a benzene radical containing the aforesaid single carboxylic acid group.

The monoazo-dyestuffs of the above formula serving as starting materials in the present process can be made by coupling a coupling-component free from sulfonic acid groups and carboxylic acid groups and capable of coupling in a position vicinal to a hydroxyl group, with a diazotized amine free from sulfonic acid groups and corresponding to the general formula (2) 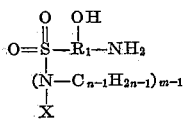

which contains in the radical X a carboxylic acid group which is not present in a position vicinal to a hydroxyl or —$NH_2$ group, the symbols $R_1$, $n$, $m$ and X having the meanings given in connection with Formula 1.

The benzene radical $R_1$ of these amines, which contains the amino group in the 2-position and the hydroxyl group in the 1-position may be bound to the —$SO_2$— group in the 4-, 5- or 6-position. It may contain further substituents incapable of salt formation, for example, an alkyl, alkoxy or acylamino group, a halogen atom or a nitro group. The benzene radical X may in addition to the carboxylic acid group contain further substituents incapable of salt formation, such as an alkyl group (for example, methyl), a methoxy group, a chlorine atom or the like, but no salt forming substituents, such as the amino or the hydroxyl group.

As amines of the Formula 2 there may be mentioned: 2-amino-1-hydroxy-6-chlorobenzene-4-sulfonic acid phenylamide-2'-carboxylic acid, 2 - amino-1-hydroxy-6-nitrobenzene-4-sulfonic acid phenylamide-2'-carboxylic acid, 2-amino-1-hydroxybenzene-4- or -5-sulfonic acid N-methylphenylamide-2'-carboxylic acid, 2-amino-1-hydroxybenzene 4- or -5-sulfonic acid phenylamide-2'-, -3'- or -4'-carboxylic acid, 2-amino-4-chloro-1-hydroxybenzene-5- or -6-sulfonic acid phenylamide-2'-carboxylic acid, 3-amino-4-hydroxydiphenylsulfone-2'-carboxylic acid and 4-amino-3-hydroxy diphenylsulfone-2'- or -4'-carboxylic acid.

As coupling components for preparing the monoazo-dyestuffs serving as starting materials in the present process there come into consideration hydroxy-compounds which are capable of coupling in a position vicinal to the hydroxyl group. By hydroxy-compounds there are to be understood aromatic hydroxy-compounds as well as compounds which owe their capacity for coupling to the presence of a keto-methylene group. The latter compounds may contain the keto-methylene group either in an open chain or in a heterocyclic ring.

As hydroxy-compounds of the aforesaid kind there may be mentioned: Para-substituted hydroxybenzenes such as 4-methyl-, 3:4-dimethyl-, 4-tertiary-amyl- or 4-acetylamino-1-hydroxybenzene and 4-methyl-2-acetylamino-1-hydroxybenzene. Dihydroxybenzenes such as resorcinol, and especially hydroxynaphthalenes and 5-pyrazolones such as 2-hydroxynaphthalene, 2:6-dihydroxynaphthalene, 2-hydroxy-6-bromo- or -6-methoxynaphthalene, 2-hydroxynaphthalene-6-sulfonic acid anilide, 2-hydroxynaphthalene-6- or -7-sulfonic acid phenyl ester and 1-hydroxy-4-methylnaphthalene, 1-hydroxy-5-chloronaphthalene, 1 - hydroxy - 5:8 - dichloronaphthalene, and also 1-hydroxynaphthalene-3-, -4- or -5-sulfonic acid isopropylamide; pyrozolones such as 3-methyl- or 3-phenyl-5-pyrazolone, 1-n-butyl-3-methyl-5-pyrazolone, 1-phenyl-3-methyl-5-pyrazolone, 1-(2'-, 3'- or 4'-chloro- or -methyl-) phenyl-3-methyl-5-pyrazolone, 5 - pyrazolone-3-carboxylic acid amides such as 5-pyrazolone-3-carboxylic acid amide, 5-pyrazolone-3-carboxylic acid -N-methyl-, ethyl-, isopropyl- or -butylamide, 5-pyrazolone-3-carboxylic acid-2'-, -3'- or -4'-chlorophenylamide, 5-pyrazolone-3-carboxylic acid-phenyl- or para-methylphenylamide, 1-3-carboxylic acid-phenyl- or para-methylphenylamide, 1-phenyl-5-pyrazolone-3-carboxylic acid amide, 1-phenyl-5-pyrazolone-3-carboxylic acid methyl-, -isopropyl-, -phenyl- or para-chlorophenylamide.

The amines of the Formula 2 may be diazotized in the usual manner, for example, with the use of sodium nitrite and hydrochloric acid. Coupling of the resulting diazo compounds with the aforesaid coupling components can also be carried out in the usual manner.

When the coupling reaction is finished the dyestuffs can be separated from the coupling mixture easily by filtration, since they are in general only slightly soluble in water.

The treatment with an agent yielding chromium is advantageously carried out in such manner that the resulting chromiferous azo-dyestuff contains one atom of chromium in complex union with two monoazo-dyestuff molecules. For this purpose it is generally desirable to use a quantity of the agent yielding metal corresponding to one gram-atom of metal for every two molecular proportions of a dyestuff of the general Formula 1 or for about one molecular proportion of each two different monoazo-dyestuffs free from sulfonic acid groups in a mixture of such dyestuffs of which at least one corresponds to the general Formula 1, and/or to carry out the metallization in a weakly acid to alkaline medium. Accordingly, there are especially suitable, for example, those metal compounds which are stable to alkaline media, for example, chromium compounds of aliphatic ortho-hydroxy-carboxylic acids, or chromium compounds of aromatic ortho-hydroxycarboxylic acids, which compounds contain the metal in complex union. As examples of aliphatic hydroxycarboxylic acids there may be mentioned inter alia lactic acid, glycollic acid, citric acid and especially tartaric acid, and among the aromatic hydroxycarboxylic acids there may be mentioned those of the benzene series such as 4-, 5- or 6-methyl-1-hydroxybenzene-2-carboxylic acid and, above all 1-hydroxybenzene-2-carboxylic acid itself. Conversion of the dyestuffs into their complex metal compounds is advantageously carried out at a raised temperature, under atmospheric or superatmospheric pressure, for example, at the boiling temperature of the reaction mixture, if desired in the presence of suitable additions, for example, in the presence of salts of organic acids, bases, organic solvents or other agents assisting the formation of complexes.

The metalization treatment described above may be applied, for example, to a single dyestuff of the Formula 1. However, it is also possible and is in many cases of advantage (for example, in order to produce different tints) to metallize a mixture of two different dyestuffs of that formula or a mixture consisting of a dyestuff of the said formula and another metallizable monoazo-dyestuff free from sulfonic acid and advantageously also free from carboxylic acid groups, for example, an ortho:ortho'-dihydroxy-monoazo-dyestuff.

The monoazo-dyestuffs to be used as starting materials in the last mentioned form of the process together with dyestuffs of the Formula 1, may be of any desired constitution provided that they are free from sulfonic acid groups and advantageously also free from carboxylic acid groups. There come into consideration both ortho:ortho'-dihydroxy- and ortho-hydroxy-ortho'-carboxy monoazo-dyestuffs which belong, for example, to the benzene-azo-benzene, benzene-azo-naphthalene, benzene-azo-pyrazolone or benzene-azo-acylacetic acid amide series. These monoazo dyestuffs can be made from the coupling components mentioned above by coupling them with diazo compounds of the following amines: 4-chloro-, 4-nitro-, 4-methyl-2-amino-1-hydroxybenzene, 4:6-dichloro- or 4:6-dinitro-2-amino-1-hydroxybenzene, 4-nitro- or 4-chloro-6-acetylamino-2-amino-1-hydroxybenzene, 6-nitro- or 6-chloro-4-acetylamino-2-amino-1-hydroxybenzene, 4-chloro- 5- or 6-nitro-2-amino-1-hydroxybenzene, 6-nitro-4-methyl-2-amine-1-hydroxybenzene, 2 - amino-1-hydroxybenzene-4- or -5-sulfonic acid amide, and the corresponding N-methyl-, -ethyl-, -isopropyl-, -octyl-, -cyclohexyl-, phenyl-, para-chlorophenyl-amides, and also 2-amino-1-hydroxybenzene-4- or -5-sulfonic acid dimethylamide or N-methylphenylamide, 2-amino-1-hydroxy-benzene-4- or -5-methylsulfone, 3-amino-4-hydroxy-diphenylsulfone, 4-amino-3-hydroxydiphenylsulfone, and also 5-nitro-2-amino-1-hydroxybenzene, 2-aminobenzene-1-carboxylic acid, 2-aminobenzene-1-carboxylic acid-5-sulfonic acid methyl- or -phenyl-amide, 2-aminobenzene-1-carboxylic acid-5-methyl-sulfone and 2-aminobenzene-1-carboxylic acid-5-sulfonic acid phenyl ester.

The chromium compounds so obtained contain two monoabo-dyestuff molecules bound to one atom of chromium in complex union, and at least one of the monoazo-dyestuff molecules must correspond to the general Formula 1. The new chromium compounds are soluble in water, and are indeed more soluble than the starting materials used for making them. They are suitable or dyeing various substances such as plastic masses, waxes, resins, lacquers and the like and especially for dyeing or printing synthetic substances composed of superpolyamides or superpolyurethanes, and above all for dyeing or printing animal materials such as silk, leather and especially wool. They are suitable for dyeing from a weakly alkaline or neutral bath, and above all from a weakly acid, for example, acetic acid bath.

The dyeings so produced are distinguished by their good level character, good properties of wet fastness and very good fastness to light.

The following examples illustrate the invention, the parts and percentages being by weight unless otherwise stated and the relationship of parts by weight to parts by volume being the same as that of the kilogram to the liter:

*Example 1*

30.8 parts of 1-hydroxy-2-aminobenzene-4-sulfonic acid-phenylamide-2'-carboxylic acid are dissolved in 150 parts of water and 22 parts of a 10 N-solution of caustic soda. The resulting clear solution is mixed with 25 parts of a 4 N-solution of sodium nitrite, and introduced dropwise at 0–2° C. into a mixture of 110 parts of water and 40 parts of 10 N-hydrochloric acid. The resulting pale yellow diazo suspension is neutralized with sodium carbonate, and added to an ice cooled solution of 22.9 parts of 1-(4'-chlorophenyl)-3-methyl-5-pyrazolone in 150 parts of water, 10 parts of a 10 N-solution of caustic soda and 15 parts of sodium carbonate. When the coupling is finished the dyestuff is completely precipitated by the addition of sodium chloride and filtered off.

One half of the dyestuff so obtained is suspended in 750 parts of water, and boiled under reflux with 75 parts of a chromium-sodium salicylate solution containing 2.67 percent of chromium for several hours. The resulting solution is neutralized by the addition of acetic acid, and the chromium complex formed is precipitated by the addition of sodium chloride, filtered off and dried.

When dry it is a red-brown substance which dissolves in dilute sodium carbonate solution with a yellow-brown coloration and in pure concentrated sulfuric acid with a yellow coloration, and dyes wool from a neutral or acetic acid bath very fast orange tints.

In the following table are given the properties of further complex chromium compounds obtainable in an analogous manner. In column (a) is given the tint of the dyeings produced on wool or fibers of a superpolyamide with the chromium complex of the dyestuff obtained from the components given in columns I and II.

| | I<br>Diazo component | II<br>Coupling component | (a)<br>Chromium complex |
|---|---|---|---|
| 1 | 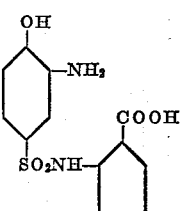 | 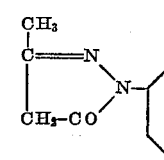 | Orange. |

| | I Diazo component | II Coupling component | (a) Chromium complex |
|---|---|---|---|
| 2 | 2-amino-1-hydroxy-benzene-4-sulfonic acid anthranilide | 6-bromo-2-naphthol | Violet grey. |
| 3 | 2-amino-1-hydroxy-benzene-4-sulfonic acid anthranilide | 2-naphthol | Do. |
| 4 | 2-amino-1-hydroxy-benzene-4-sulfonyl anthranilic acid | 1,5-dichloro-8-hydroxy-naphthalene (2,8-dichloro-1-naphthol) | Blue. |
| 5 | 2-amino-1-hydroxy-benzene-4-sulfonic acid anthranilide | 1-(4'-chlorophenyl)-3-methyl-5-pyrazolone carboxamide | Red. |
| 6 | 2-amino-1-hydroxy-benzene-4-(3'-carboxy)phenylsulfonamide | 2-naphthol | Violet grey. |
| 7 | 2-amino-1-hydroxy-benzene-4-(3'-carboxy)phenylsulfonamide | 1-(4'-chlorophenyl)-3-methyl-5-pyrazolone | Orange. |
| 8 | 2-amino-1-hydroxy-benzene-4-(4'-carboxy)phenylsulfonamide | 1-(4'-chlorophenyl)-3-methyl-5-pyrazolone | Do. |

(Note: the structures shown in columns I and II are drawn graphically in the original; names above are indicative readings of those structures.)

| | I Diazo component | II Coupling component | (a) Chromium complex |
|---|---|---|---|
| 9 | 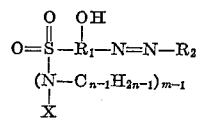 | 2-hydroxynaphthalene | Violet grey. |
| 10 | 4-hydroxy-3-amino-phenyl sulfone with COOH-cyclohexyl | 1,4-dichloro-hydroxynaphthalene | Blue grey. |
| 11 | 4-hydroxy-3-amino-phenyl SO₂-N(C₂H₅)-COOH-phenyl | 2-hydroxynaphthalene | Violet grey. |
| 12 | 4-hydroxy-3-amino-5-chloro-phenyl sulfone NH-COOH-phenyl | 1-(4-chlorophenyl)-3-methyl-5-pyrazolone | Scarlet. |
| 13 | 4-hydroxy-3-amino-phenyl-SO₂NH-(COOH,OC₂H₅-phenyl) | 1-(4-chlorophenyl)-3-methyl-5-pyrazolone | Orange. |

Example 2

2 parts of the chromiferous dyestuff obtained as described in Example 1 are dissolved in 4000 parts of water, 10 parts of crystalline sodium sulfate are added and 100 parts of well wetted wool are entered into the resulting dyebath at 40–50° C. 2 parts of acetic acid of 40 percent strength are then added, the temperature is raised to the boil in the course of ½ hour, and dyeing is carried on at the boil for ¾ hour. Finally the wool is first rinsed with cold water and dried. The wool is dyed a orange tint of good fastness especially to light.

The same dyeing is obtained by dyeing from a neutral bath, that is to say without the addition of acetic acid to the bath.

What is claimed is:

1. A complex chromium compound containing one atom of chromium bound in complex union with substantially two molecules of a monoazo dyestuff free from sulfonic acid groups and containing a single carboxylic acid group, which monoazo dyestuff corresponds to the formula $$O=\overset{O}{\underset{\|}{S}}-R_1-N=N-R_2$$
$$(N-C_{n-1}H_{2n-1})_{m-1}$$
$$|$$
$$X$$

wherein $R_1$ represents a benzene radical bound to the azo linkage in ortho-position relatively to the hydroxyl group, $R_2$ represents the radical of a coupling component selected from the group consisting of a 5-pyrazolone bound to the azo linkage in 4-position, a chlorinated 1-hydroxynaphthalene bound to the azo linkage in 2-position, and a 2-hydroxynaphthalene bound to the azo linkage in 1-position and containing at most as single substituent a bromine atom, $n$ represents a whole number up to 7, $m$ a whole number up to 2 and X a benzene radical which contains as single salt forming group the said carboxylic acid group.

2. A complex chromium compound containing one atom of chromium bound in complex union to substantially two molecules of a monoazo dyestuff of the formula

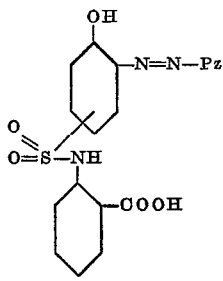

wherein Pz represents a 5-pyrazolone radical free from sulfonic and carboxylic acid groups and bound to the azo linkage in 4-position, which radical contains a chlorophenyl radical.

3. A complex chromium compound containing one atom of chromium bound in complex union to substantially two molecules of a monoazo dyestuff of the formula

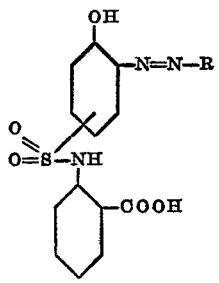

wherein R represents a chlorinated 1-hydroxynaphthalene radical bound to the azo linkage in 2-position and free from sulfonic and carboxylic acid groups.

4. The complex chromium compound containing one atom of chromium bound in complex union with substantially two molecules of the monoazo dyestuff of the formula

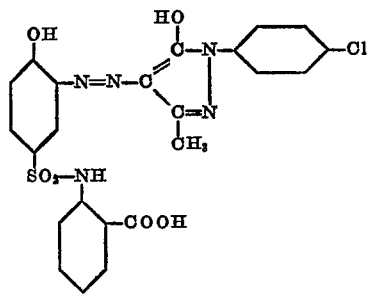

5. The complex chromium compound containing one atom of chromium bound in complex union with substantially two molecules of the monoazo dyestuff of the formula

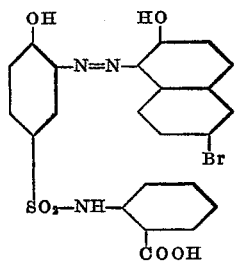

6. The complex chromium compound containing one atom of chromium bound in complex union with substantially two molecules of the monoazo dyestuff of the formula

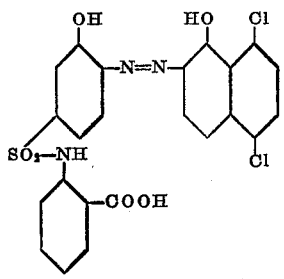

7. The complex chromium compound containing one atom of chromium bound in complex union with substantially two molecules of the monoazo dyestuff of the formula

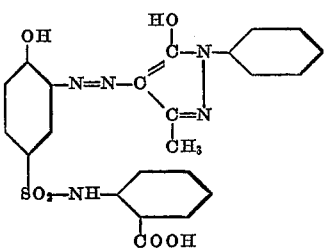

References Cited in the file of this patent

UNITED STATES PATENTS

| | | |
|---|---|---|
| 1,814,218 | Holzach et al. | July 14, 1931 |
| 2,597,676 | Schetty | May 20, 1952 |
| 2,634,263 | Steinemann | Apr. 7, 1953 |

OTHER REFERENCES

Row et al.: J. Soc. Dyers Colourists, vol. 62, 1946, pp. 372–373.

Weidmann: American Dyestuff Reporter, March 15, 1954, p. 167.